United States Patent
Basavaraja et al.

(10) Patent No.: US 9,813,344 B2
(45) Date of Patent: *Nov. 7, 2017

(54) METHOD AND SYSTEM FOR LOAD BALANCING IN A SOFTWARE-DEFINED NETWORKING (SDN) SYSTEM UPON SERVER RECONFIGURATION

(71) Applicant: Telefonaktiebolaget LM Ericsson (publ), Stockholm (SE)

(72) Inventors: Rohith Basavaraja, Bangalore (IN); Prashant Anand, Bangalore (IN); Mustafa Arisoylu, San Jose, CA (US); Himanshu Asnani, Santa Clara, CA (US); Myna Vajha, Santa Clara, CA (US); Arvind Mukundan, Sunnyvale, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,474

(22) Filed: Oct. 5, 2016

(65) Prior Publication Data
US 2017/0026294 A1    Jan. 26, 2017

Related U.S. Application Data

(63) Continuation of application No. 14/575,021, filed on Dec. 18, 2014, now Pat. No. 9,497,123.

(51) Int. Cl.
*H04L 29/06* (2006.01)
*H04L 12/803* (2013.01)
(Continued)

(52) U.S. Cl.
CPC ........ *H04L 47/125* (2013.01); *H04L 41/0813* (2013.01); *H04L 45/745* (2013.01);
(Continued)

(58) Field of Classification Search
CPC ..... H04L 47/125; H04L 45/745; H04L 69/22; H04L 67/1002; H04L 29/08144; H04L 29/08153; H04L 67/1029
(Continued)

(56) References Cited

U.S. PATENT DOCUMENTS 9,083,710 B1 *   7/2015   Yadav ................. H04L 67/1004
9,118,571 B2 *   8/2015   Bisht ..................... H04L 47/125
(Continued)

FOREIGN PATENT DOCUMENTS

EP            2693696 A1      2/2014

OTHER PUBLICATIONS

Kompella K., et al., "Virtual Private LAN Service (VPLS) Using BGP for Auto-Discovery and Signaling," Network Working Group, RFC 4761, 2007, 28 pages, http://tools.ietf.org/html/rfc4761.
(Continued)

*Primary Examiner* — Robert Lopata
(74) *Attorney, Agent, or Firm* — Nicholson De Vos Webster & Elliott LLP

(57) ABSTRACT

In one embodiment, a method for load balancing in a software-define networking (SDN) system includes, upon receiving a packet, determining whether a matching entry for the packet in a server distribution table contains both a current and new server selection. If the matching entry contains both, it is determined whether there is a matching entry for the packet in a transient flow table, where the transient flow table maintains server selections when at least one of the plurality of servers is reconfigured. Upon determining that there is no matching entry for the packet in the transient flow table, the method determines whether the packet is a first packet of a traffic flow. If the packet is the first packet of a traffic flow, the packet is forwarded according to the new server selection of the matching entry in the
(Continued)

server distribution table, and the transient flow table is updated.

20 Claims, 7 Drawing Sheets

(51) Int. Cl.
    *H04L 12/741*    (2013.01)
    *H04L 12/24*    (2006.01)
    *H04L 29/08*    (2006.01)

(52) U.S. Cl.
    CPC ...... *H04L 67/1002* (2013.01); *H04L 67/1004* (2013.01); *H04L 69/22* (2013.01)

(58) Field of Classification Search
    USPC .......................................................... 370/235
    See application file for complete search history.

(56) References Cited

U.S. PATENT DOCUMENTS

| | | | | |
|---|---|---|---|---|
| 9,137,165 | B2* | 9/2015 | Anand | H04L 47/125 |
| 2011/0055845 | A1* | 3/2011 | Nandagopal | H04L 67/1023 718/105 |
| 2013/0297798 | A1* | 11/2013 | Arisoylu | H04L 67/1027 709/226 |
| 2013/0318239 | A1* | 11/2013 | Scharf | H04L 69/16 709/224 |
| 2014/0025800 | A1* | 1/2014 | Sharma | H04L 67/1095 709/223 |
| 2014/0372567 | A1* | 12/2014 | Ganesh | H04L 67/1002 709/219 |
| 2014/0372616 | A1* | 12/2014 | Arisoylu | H04L 67/1002 709/226 |
| 2014/0379938 | A1* | 12/2014 | Bosch | H04L 47/125 709/242 |
| 2015/0215236 | A1* | 7/2015 | Joshi | H04L 47/806 707/754 |
| 2015/0312155 | A1* | 10/2015 | Anand | H04L 45/7453 370/231 |
| 2015/0350156 | A1* | 12/2015 | Ma | H04L 43/00 709/245 |
| 2016/0080481 | A1* | 3/2016 | Bisht | H04L 67/1002 370/235 |

OTHER PUBLICATIONS

Lasserre M., et al., "Virtual Private LAN Service (VPLS) Using Label Distribution Protocol (LDP) Signaling," Network Working Group, Request for Comments 4762, Category: Standards Track, Alcatel-Lucent, The IETF Trust, 2007, 31 pages.
Yang Yu., et al., "A Framework of Using OpenFiow to Handle Transient Link Failure", 2011 International Conference on Transportation, Mechanical, and Electrical Engineering (TMEE), IEEE, 2011, pp. 2050-2053.
OpenFlow Switch Specification Version 1.3.1 (Wire Protocol 0x04), The Open Networking Foundation copyright 2012, 128 pages, https://www.opennetworking.org/images/stories/downloads/sdn-resources/onf-specifications/openflow/openflow-spec-v1.3.1.pdf.
RFC 1180: Socolofsky T., et al., "A TCP/IP Tutorial," 1991, 28 pages, Network Working Group, Request for Comments: 1180.
RFC 2460: Deering S., et al., "Internet Protocol Version 6 (IPv6)," 1998, 39 pages, Network Working Group, Standards Track, Request for comments: 2460.
RFC 2474: Nichols K., "Definition of the Differentiated Services Field (DS Field) in the IPv4 and IPv6 Headers," 1998, 20 pages, Network Working Group, The Internet Society, Request for Comments: 2474.
RFC 2475: Blake S., "An Architecture for Differentiated Services," 1998, 36 pages, Network Working Group, The Internet Society, Request for Comments: 2475.
RFC 2597: Heinanen J., et al., "Assured Forwarding PHB Group," 1999, 11 pages, The Internet Society, Request for comments: 2597.
RFC 2675: Borman D., "IPv6 Jumbograms," 1999, 9 pages, Network Working Group, The Internet Society, Request for Comments: 2675.
RFC 2983: Black D., "Differentiated Services and Tunnels," 2000, 14 pages, Network Working Group, The Internet Society, Request for Comments: 2983.
RFC 3086: Nichols K, et al., "Definition of Differentiated Services Per Domain Behaviors and Rules for their Specification," 2001, 24 pages, Network Working Group, Request for Comments: 3086.
RFC 3140: Black D., et al., "Per Hop Behavior Identification Codes," 2001, 8 pages, Network Working Group, Standards Track, Request for Comments: 3140.
RFC 3246: Davie B., et al., "An Expedited Forwarding PHB (Per-Hop Behavior)," 2002, 16 pages, The Internet Society, Request for Comments: 3246.
RFC 3247: Charny A., et al., "Supplemental Information for the New Definition of the EF PHB (Expedited Forwarding Per-Hop Behavior)," 2002, 24 pages, Network Working Group, The Internet Society, Request for Comments 3247.
RFC 3260: Grossman D., "New Terminology and Clarifications for Diffserv," 2002, 10 pages, Network Working Group, The Internet Society, Request for Comments: 3260.
RFC 3289: Baker F., et al., "Management Information Base for the Differentiated Services Architecture," 2002, 116 pages, Network Working Group, The Internet Society, Request for Comments: 3289.
RFC 3290: Bernet Y., et al., "An Informal Management Model for Diffserv Routers," 2002, 56 pages, Network Working Group, The Internet Society, Request for Comments: 3290.
RFC 3317: Chan K., et al., "Differentiated Services Quality of Service Policy Information Base," 2003, 96 pages, Network Working Group, The Internet Society, Request for Comments: 3317.
RFC 4113: Fenner B., et al., "Management Information Base for the User Datagram Protocol (UDP)," 2005, 19 pages, Network Working Group, The Internet Society, Request for Comments: 4113.
RFC 4301: Kent S., et al., "Security Architecture for the Internet Protocol," Dec. 2005, 101 pages, The Internet Society, Network Working Group, Request for Comments: 4301.
RFC 4309: Housley., "Using Advanced Encryption Standard (AES) CCM Mode with IPsec Encapsulating Security Payload (ESP)," 2005, 13 pages, The Internet Society, Network Working Group, Request for Comments: 4309.
RFC 4364: Rosen, et al., "BGP/MPLS IP Virtual Private Networks (VPNs)," Feb. 2006, 47 pages, The Internet Society, Network Working Group, Request for Comments: 4364.
RFC 4594: Babiarz J., et al., "Configuration Guidelines for DiffServ Service Classes," 2006, 57 pages, Network Working Group, Request for Comments: 4594.
RFC 5405: Eggert L., et al., "Unicast UDP Usage Guidelines for Application Designers," 2008, 27 pages, Network Working Group, IETF Trust, Request for Comments: 5405.
RFC 5865: Baker F., "A Differentiated Services Code Point (DSCP) for Capacity-Admitted Traffic," May 2010, 14 pages, Internet Engineering Task Force (IETF), IETF Trust, Request for Comments: 5865.
RFC 768: Postel, "User Datagram Protocol," Aug. 28, 1980, 3 pages, Network Working Group, Request for Comments: 768.
RFC 793: Postel J.,"Transmission Control Protocol," Sep. 1981, 91 pages, DARPA Internet Program Protocol Specification, Request for comments: 793.

* cited by examiner

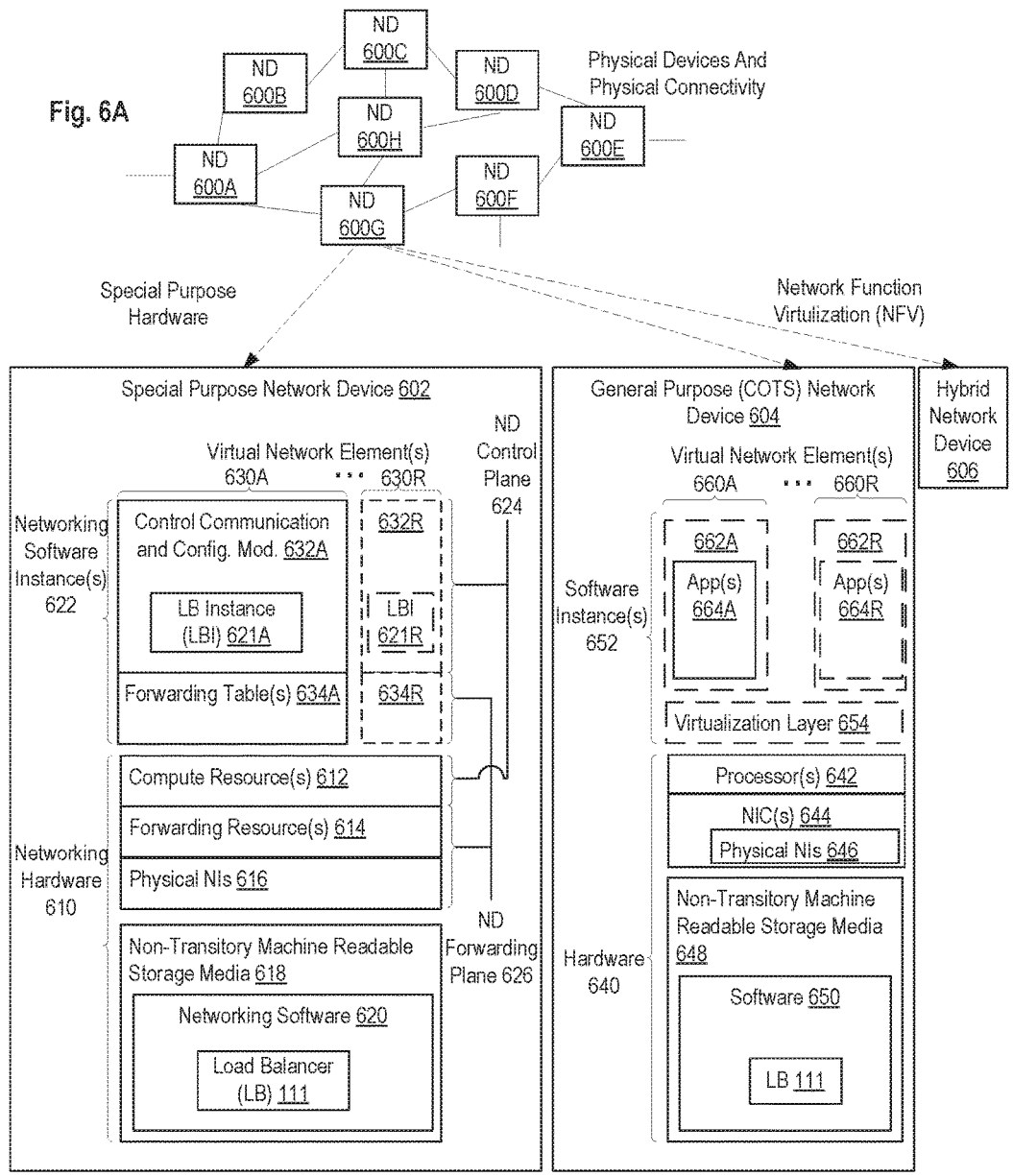

METHOD AND SYSTEM FOR LOAD BALANCING IN A SOFTWARE-DEFINED NETWORKING (SDN) SYSTEM UPON SERVER RECONFIGURATION

CROSS-REFERENCE TO RELATED APPLICATIONS

This application is a continuation of application Ser. No. 14/575,021, filed Dec. 18, 2014, which is hereby incorporated by reference.

FIELD OF INVENTION

The embodiments of the invention are related to the field of networking. More specifically, the embodiments of the invention relate to a method and system to performing load balancing in a software-defined networking (SDN) system.

BACKGROUND

Load balancing is a computer networking method for distributing workloads across multiple computing resources, such as computers, a computer cluster, network links, central processing units or disk drives. Load balancing aims to optimize resource use, maximize throughput, minimize response time, and avoid overload of any one of the resources. Using multiple components with load balancing instead of a single component may increase reliability through redundancy. Thus, load balancing is widely used to enhance scalability and availability of a telecommunication and information technology (IT) applications.

In a typical load balancing implementation, a load balancing system generally includes a load distributor implemented in a network element to distribute traffic, and the load distributor is coupled to a number of servers (sometimes referred to as backend servers) in a cluster that processes packets transmitted from clients. The load balancer applies a load balancing policy to determine to which server the packets are to be sent.

The server configuration in a cluster may change over time. Some servers may become unavailable due to maintenance activities; others may be added to enhance the performance of the load balancing. The reconfiguration of the cluster often happens when the servers in the clusters are carrying ongoing traffic.

SUMMARY

A method is disclosed for load balancing in a network device coupled to a software-defined networking (SDN) system. The SDN system contains a set of network devices forwarding traffic flows and a SDN controller managing the set of network devices. The method includes upon receiving a packet for load balancing among a plurality of severs, determining whether a matching entry for the packet in a server distribution table contains both a current and a new server selection. Upon determining that the matching entry in the server distribution table contains both the current and new server selection, the method determines whether there is a matching entry for the packet in a transient flow table, where the transient flow table maintains server selections when at least one of the plurality of servers is reconfigured so that at least one of the traffic flows is to be load balanced from one server to another server. Upon determining that there is no matching entry for the packet in the transient flow table, the method determines whether the packet is a first packet of a traffic flow. Upon determining that the packet is the first packet of a traffic flow, the packet is forwarded according to the new server selection of the matching entry in the server distribution table and the transient flow table is updated to add a matching entry for the traffic flow indicating the new server selection.

An apparatus is disclosed for load balancing. The apparatus is coupled to a software-defined networking (SDN) system, the SDN system contains a set of network devices forwarding traffic flows and a SDN controller managing the set of network devices. Upon receiving a packet for load balancing among a plurality of severs, the apparatus determines whether a matching entry for the packet in a server distribution table contains both a current and a new server selection. Upon determining that the matching entry in the server distribution table contains both the current and new server selection, the apparatus determines whether there is a matching entry for the packet in a transient flow table, where the transient flow table maintains server selections when at least one of the plurality of servers is reconfigured so that at least one of the traffic flows is to be load balanced from one server to another server. Upon determining that there is no matching entry for the packet in the transient flow table, the apparatus determines whether the packet is a first packet of a traffic flow. If the packet is the first packet of a traffic flow, the apparatus forwards the packet according to the new server selection of the matching entry in the server distribution table, and updates the transient flow table to add a matching entry for the traffic flow indicating the new server selection.

A non-transitory machine-readable medium for load balancing is disclose. The non-transitory machine-readable medium has instructions stored therein, which when executed by a processor, cause the processor to perform operations in a network device coupled to a software-defined networking (SDN) system, where the SDN system contains a set of network devices forwarding traffic flows and a SDN controller managing the set of network devices. The operations include upon receiving a packet for load balancing among a plurality of severs, determining whether a matching entry for the packet in a server distribution table contains both a current and a new server selection, upon determining that the matching entry in the server distribution table contains both the current and new server selection, the operations continue with determining whether there is a matching entry for the packet in a transient flow table, where the transient flow table maintains server selections when at least one of the plurality of servers is reconfigured so that at least one of the traffic flows is to be load balanced from one server to another server. Upon determining that there is no matching entry for the packet in the transient flow table, the operations continue with determining whether the packet is a first packet of a traffic flow. Upon determining that the packet is the first packet of a traffic flow, the packet is forwarded according to the new server selection of the matching entry in the server distribution table; and the transient flow table is updated to add a matching entry for the traffic flow indicating the new server selection.

Embodiments of the invention provide ways for a SDN system to change server configuration of load balancing in the SDN system by reconfiguring a number of servers while minimizing impact to the ongoing traffic of the SDN system.

BRIEF DESCRIPTION OF THE DRAWINGS

The present invention is illustrated by way of example, and not by way of limitation, in the figures of the accompanying drawings in which like references indicate similar elements.

FIG. 6A illustrates connectivity between network devices (NDs) within an exemplary network, as well as three exemplary implementations of the NDs, according to some embodiments of the invention.

FIG. 6B illustrates an exemplary way to implement a special-purpose network device according to some embodiments of the invention.

DETAILED DESCRIPTION

Figure 1:
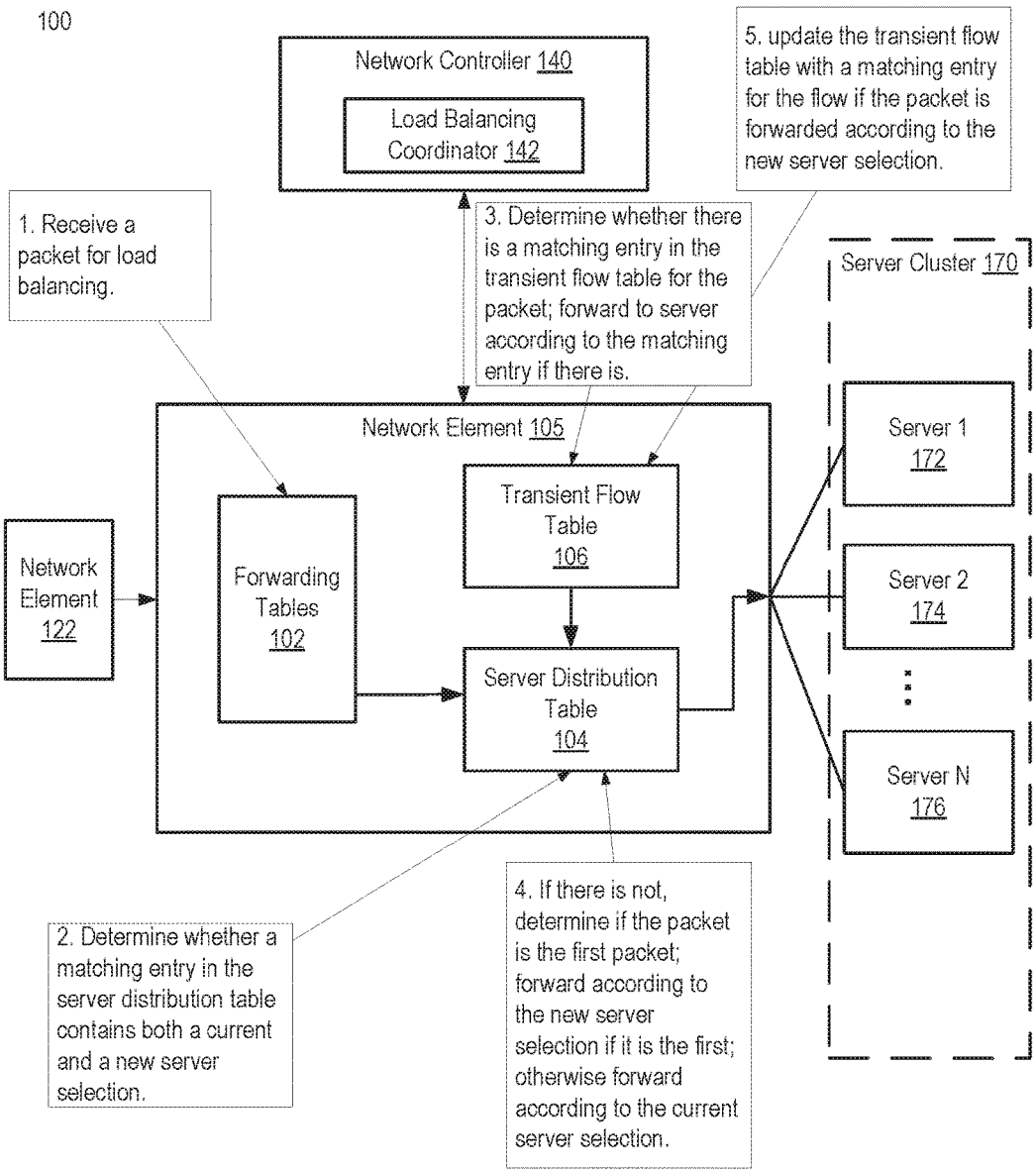
FIG. 1 is a block diagram illustrating operations of load balancing according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. A network device is an electronic device. A network element, as explained in more details herein below, is implemented in one or more network devices and a network device may include one or more network elements.

Architecture and Operations of Load Balancing

In a software-defined networking (SDN) system, packets are forwarded through traffic flows (or simply referred to as flows), and a network element forwards the flows based on its forwarding tables, which are managed by a network controller (also referred to as a SDN controller, the terms are used interchangeably in the specification). Thus, load balancing in a SDN system is preferably performed on per flow basis. A flow may be defined as a set of packets whose headers match a given pattern of bits. A flow may be identified by a set of attributes embedded to one or more packets of the flow. An exemplary set of attributes includes a 5-tuple (source and destination IP addresses, a protocol type, source and destination TCP/UDP ports).

In a typical implementation of load balancing in a SDN system, a load distributor (a network element of the SDN system) presents a virtual Internet Protocol (IP) address towards the client side (e.g., another network element). The virtual IP address (referred to as VIP, or VIPA) is shared among multiple servers in a cluster (e.g., each server being a network element of the SDN system). The load distributor receives packets and examines the packet headers to determine whether load balancing is to be applied for the packets. If it is, the load distributor forwards the packets to one of the servers according to a load balancing scheme of the load distributor.

Server configuration in the cluster may change in a variety of ways. A server may be added to the cluster, and the addition is referred to as a server scale-out. A server may also be removed from the cluster, and the removal is referred to as a server scale-in. Each server may be associated with a weight and the weight determines the percentage of current traffic forwarded to the server. The weight of each server may be changed due to scale-out or scale-in, and it may also be changed based on change of characteristics of each server. The change of server weights causes some flows to be redistributed from one server (a current server) to another server (a new server). During the redistribution process triggered by a server reconfiguration (due to server weight changes or otherwise), the flow is associated with both the current server and the new server. The load balancing system is referred to as in a transient state during the server reconfiguration. In contrast, the load balancing system is referred to as in a steady (or stable) state when there is no server reconfiguration and each flow is associated with only one server thus only forward to one server for processing.

During the transient state, if packets of a flow is redistributed midstream from the current server to the new server, the redistribution causes traffic disruption as some packets get dropped after the current server successfully processes a last packet of the flow forwarded to it and prior to the new server successfully processing a first packet of the flow forwarded to the new server.

In order to minimize the traffic disruption, a number of approaches have been proposed, but these approaches have drawbacks that limit their effectiveness in a SDN system. Upon examining the disadvantages of the existing approaches, one may expect an effective approach to handle the transient state in a SDN load balancing system to have one or more of the following characteristics:

It is desirable to have an implementation of load balancing during the server reconfiguration without maintaining flow states. A numerous stateful approaches are known in the art. In a stateful approach, the load distributor stores the state of flows, and when the flow is to be redistributed from a current server to a new server, the state information is used to forward traffic to the new server. The stateful approaches require a large amount of state information being maintained at the flow level. A network element often forwards thousands even millions of flows, maintaining state information at the flow level in the network element is burdensome and hard to implement.

It is desirable to have the implementation without requiring the assistance of the SDN controller to make packet forward decision. In a SDN system, a stateless approach for load balancing may be implemented through the assistance of the SDN controller. During the transient state, a packet of the flow that is associated with both the current server and the new server may be sent to the SDN controller (e.g., using the PACKET_IN format of the OpenFlow standard), which makes the determination which server the packet is to be sent to. However, the SDN controller being involved slows down the packet forwarding (the process includes sending a packet to the SDN controller, followed by receiving an instruction from the SDN controller, and then followed by the network element forwarding the packet).

It is desirable to have the implementation with minimum changes to the existing SDN standard. As a SDN standard, the OpenFlow protocol (including OpenFlow Switch Specification, the latest version being version 1.3.4, published on Mar. 27, 2014) is gaining traction in the industry. Network elements and SDN controllers have been implemented in compliance with the OpenFlow standard. It is desirable to be able to implement load balancing during the server reconfiguration without altering OpenFlow standard operations outside of the network element (e.g., the load distributor) performing the load balancing. In other words, the other network element and the SDN controller coupled to that network element preferably may operate in complying with the OpenFlow standard, even though that network element performs additional operations during the server reconfiguration.

Embodiments of the invention aim at having all the characteristics. FIG. 1 is a block diagram illustrating operations of load balancing according to one embodiment of the invention. System 100 contains a network controller 140, network elements 122 and 105, and a server cluster 170 containing a set of servers at references 172 to 176, where each server may be a network element.

Network controller 140 contains a load balancing coordinator 142, which coordinates load balancing of a load distributor of the system such as network element 105. Load balancing coordinator 142 may monitor the server status of server cluster 170 and determine whether or not server weights of different servers need to be adjusted. In addition, load balancing coordinator 142 may also determine how flows will be distributed (e.g., when new server is added, which flow will be distributed to the new server; when an existing server is to be removed, which server the flows on the existing server should be moved to). The server reconfiguration such as mapping the flows to the current and new servers may be performed by load balancing coordinator 142 alone in one embodiment. In an alternative embodiment, the server reconfiguration may be performed by the load balancing coordinator 142 with the assistance of the load distributor (e.g., network element 105), based on the characteristics of the load distributor.

Network element 105 is the load distributor of the SDN system. It receives flows of packets from clients such as network element 122, and distributes them to the servers of server cluster 170. Each flow is to be processed by one server when the system is in a steady state. Task boxes 1-5 illustrate the order in which operations of load balancing are performed according to one embodiment of the invention.

At task box 1, network element 105 receives a packet for load balancing. Network element 105 may receive packets for many clients and only a portion of the packets requires the process of load balancing. The packet requiring load balancing may be indicated through its destination address, e.g., it may contain the VIPA shared among the servers in server cluster 170. In that or an alternative embodiment, network element 105 may check other characteristics of the packet or the associated flow of the packet (e.g., the flow containing a quality of service (QoS) requirement, which needs speedy processing in the system), and determines that load balancing is needed, and assigns the VIPA to the packet of the flow.

Forwarding tables, as discussed in more details herein in relation to FIGS. 6A-6F, determine how packets are to be forwarded. Once it is determined that the received packet is for load balancing, network element 105 looks up server distribution table 104 and determines which server the received packet is to be forwarded to. A server distribution table contains a number of entries, each point to one or more server selection. In one embodiment, when there is no server redistribution in server clusters in system 100, network element 105 as the load distributor, operates in a steady state, and each entry in the server distribution table indicates one server for a matching flow to be forwarded to. When there is a server redistribution in server clusters, network element operates in a transient state, and some entries in the server distribution table indicate two server selections. One server selection is the current server selection, indicating the current server to which packets of the matching flow are to be forwarded to. Another server selection is the new server selection, indicating a new server to which packets of the matching flow are about to be forwarded to. Note a server distribution table such as server distribution table 104 is updated throughout the operations of system 100. The update of server distribution table is not necessary triggered by server weight changes and it could be triggered by other events that network controller 140 and/or network element 105 deem necessary to cause update of the server distribution table. For example, upon a timer expiration, new server selections may be moved to its corresponding current server selections so that the system moves from a transient state to a steady state.

At task box 2, network element 105 determines if a matching entry in the server distribution table contains both a current and new server selection. If network element 105 determines that there is no matching entry in server distribution table 104, the packet is not to be forwarded to a server within server cluster 170, and it may be sent to network controller 140 for a forwarding decision or it may be dropped. If network element 105 determines that there is a matching entry in server distribution table 104 and the matching entry contains only the current server selection, the packet is forwarded according to the current server selection.

Figure 2:
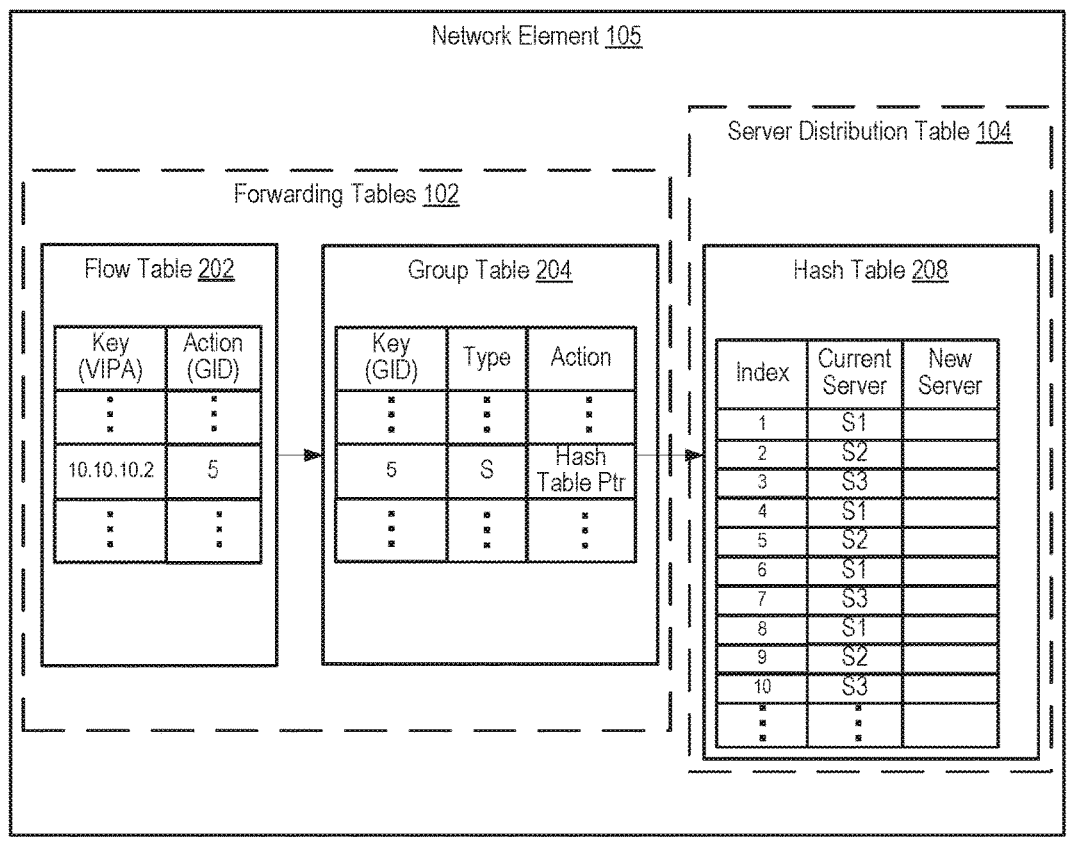
FIG. 2 illustrates an implementation of forwarding tables and a server distribution table according to one embodiment of the invention.

Forwarding tables 102 and a server distribution table 104 may be implemented in a variety of ways. FIG. 2 illustrates an implementation of forwarding tables and a server distribution table according to one embodiment of the invention. Forwarding tables 102 and server distribution table 104 in FIG. 2 are the same as the ones in FIG. 1, and the combination of a flow table 202 and a group table 204 are an implementation of forwarding tables 102, and a hash table 208 is an implementation of server distribution table 104.

Flow table 202 and group table 204 may be implemented in compliance with the OpenFlow standards. A flow table entry in flow table 202 may contain match fields, priority, counters, instructions (also referred to as actions), timeouts, and cookies. A flow table entry is matched through a key, which is to be matched against match fields of the flow table entry. In this example, the key for a packet for load balancing to match is its destination address, which is a virtual IP address (VIPA) shared by the server cluster 170, the VIPA is 10.10.10.2. The actions include a group identifier (GID) in group table 204, thus pointing a matching packet which GID the matching packet uses to find a matching entry in group table 204. The GID may be a numeric number (e.g., a 32-bit unsigned integer) that uniquely identifies a group.

Once the GID is determined for a received packet, network element 105 looks up group table 204 for a matching entry. Other than GID, group table entries in group table 204 may contain group types to determine group semantics, counters to update when a packet is processed by a group, and action buckets including an ordered list of actions to execute and associated parameters. A group table entry generally allows the packets of a matching flow to be forwarded to one of the following: a port on a group of ports (for load-balancing, where each port corresponds to a server to forward the packet toward), a first live port on a group of ports (for failover), and all ports on a group of ports (for multicasting). When the group type is set to "select," the packet is to be forwarded for load balancing.

In the example of FIG. 2, the packet with key of VIPA of 10.10.10.2 is matched in flow table 202, which points to a group with GID=5. In group table 204, a matching entry for GID=5 can be found, and it is for load-balancing (with "s" being the shorthand of select), and the action bucket for the load-balancing points to a hash table pointer, which points to a hash table for server distribution. Note a load distributor may utilize a variety of load balancing schemes, including utilizing a hash table and round-robin. Within utilizing a hash table, the hashing can be performed utilizing different, user configured tuple so that server distribution may be done differently. Hash table 208 illustrates one implementation of the hashing. The hash table pointer for the group with GID=5 points to hash table 208, which contains server selections at one point in time. Network element 105 selects one entry in hash table 208 based on a particular hashing algorithm as the load balancing scheme. In this example, assume the hashing results the selection of the entry with index 7, which points to server 3 (S3 in the figure) as the current server selection. Since there is no new server selection, the received packet will be forwarded to server 3 for load balancing.

Note all the entries in hash table 208 contain only current server selection. Thus, the server selection of hash table 208 in FIG. 2 illustrates the selection when network element 205 is in a steady state. Note in normal operation, it should not occur where the current server selection is empty and the new server selection indicates a server. That is an abnormal condition, and network element 105 needs to troubleshoot and fix the abnormal condition.

Figure 3:
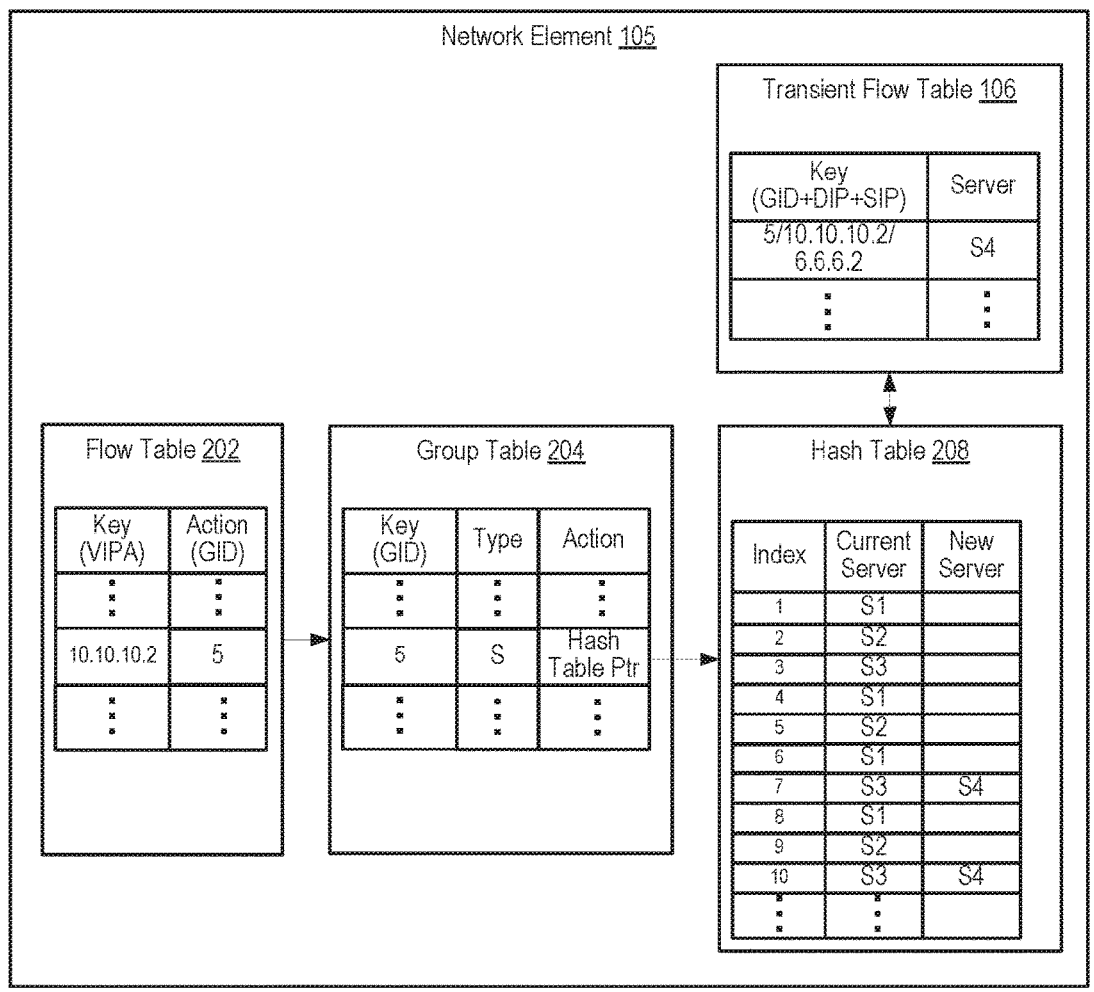
FIG. 3 illustrates the statuses of various tables in a load distributor during a transient state according to one embodiment of the invention.

While FIG. 2 illustrates the status of tables in a steady state, FIG. 3 illustrates the statuses of various tables in a load distributor during a transient state according to one embodiment of the invention. FIG. 3 is similar to FIG. 2, and the same or similar references indicate elements or components having the same or similar functionalities.

Referring to FIG. 3, network element 105 is in a transient state, and some entries (items 7 and 10) in hash table 208 contain both current and new server selections. In both cases, the current server is server 3 (S3) and the new server is server 4 (S4). The change of server selection may be triggered by a server weight adjustment or other events that network controller 140 and/or network element 105 deem necessary to cause update of hash table 208. Embodiments of the invention is agnostic to the mechanism and rationale of update of a service distribution table such as hash table 208, and it only concerns that at least one of the plurality of servers is reconfigured so that at least one of the flows is to be load balanced from one server to another server. Same as FIG. 2, here it is assumed that the hashing results in the selection of the entry with index 7.

Referring back to FIG. 1, after determining that a matching entry in the server distribution table 104 containing both the current and new server selection (e.g., servers 3 and 4 respectively as illustrated in FIG. 3) for the received packet, the network element determines whether there is a matching entry in the transient flow table for the received packet at task box 3.

The transient flow table is a table that can be used to store new flows learnt during the transient state. A new flow is a flow that starts coming to the network element 105 after the start of the transient state. The transient flow table may also be used to learn existing flows, as well as assisting in handling flows that is long lasting (the flows being existing prior to the transient state or new flows learnt during the transient state). Network element 105 may maintain the transient flow table without the assistance of network controller 140. Indeed, network controller 140 may not be necessarily aware of the existence of the transient flow table. The transient flow table may be removed when network element 105 returns to a steady state. Thus, network element 105, as the load distributor, may contain forwarding tables 102 and server distribution table 104 (that may contain their implementation such as flow table 202, group table 204, and hash table 208) during a steady state as illustrated in FIG. 2, and it may contain these tables and additionally transient flow table 106 as illustrated in FIG. 3. For an implementation of network element in compliance with the OpenFlow standard, there may be no modification of forwarding tables and server distribution table. The only extension to the OpenFlow standard can be the addition of interaction with a transient flow table during the transient state of the load balancing, and the extension do not cause changes to the network controller or the other network elements (such as clients sending packets to the network element and the network elements serving as the servers for processing traffic flows). Note the transient flow table may be implemented in a variety of data structures, such as maps, lists, arrays, files, tables, relational databases, etc. Further, the illustration and discussion of columns and rows within the table is arbitrary; while one implementation may choose to put entries in rows it is trivial to modify the data structure to put entries in columns instead.

FIG. 3 illustrates an implementation of the transient flow table. The transient flow table may contain multiple entries. The transient flow table entry is keyed on a group identifier (GID), a destination IP address (DIP), and a source IP address (SIP). A packet matching the key will be directed to the indicated server for packet forwarding. The composition of keys for matching in the transient flow table may vary widely depending on implementation.

Referring back to FIG. 1, if there is a matching entry in the transient flow table for the received packet, the indicted server in the matching entry is used to forward the received packet. If there is no matching entry in the transient flow table, the network element determines if the received packet is the first packet of a flow at task box 4. If the received packet is the first packet of a flow, the received packet is forwarded to the server indicated in the new server selection in the matching entry in the server distribution table 104. If the received packet is not the first packet of a flow, the received packet is forwarded to the server indicated in the current server selection in the matching entry in the server distribution table 104.

At task box 5, the network element then updates the transient flow table with a matching entry for the flow if the received packet is forwarded according to the new server selection, indicating that any future packet of the flow will be forwarded to the server indicated in the new server selection in the matching entry in the server distribution table. FIG. 3 illustrates transient flow table 106, which has been updated with the matching entry for the flow with the key of GID=5, DIP=10.10.10.2, and SIP=6.6.6.2. The future packets of the flow will contain these matching fields, and thus they will be directed to the new server selection, server 4, as illustrated in hash table 208 at index 7.

Flow Diagrams

Figure 4:
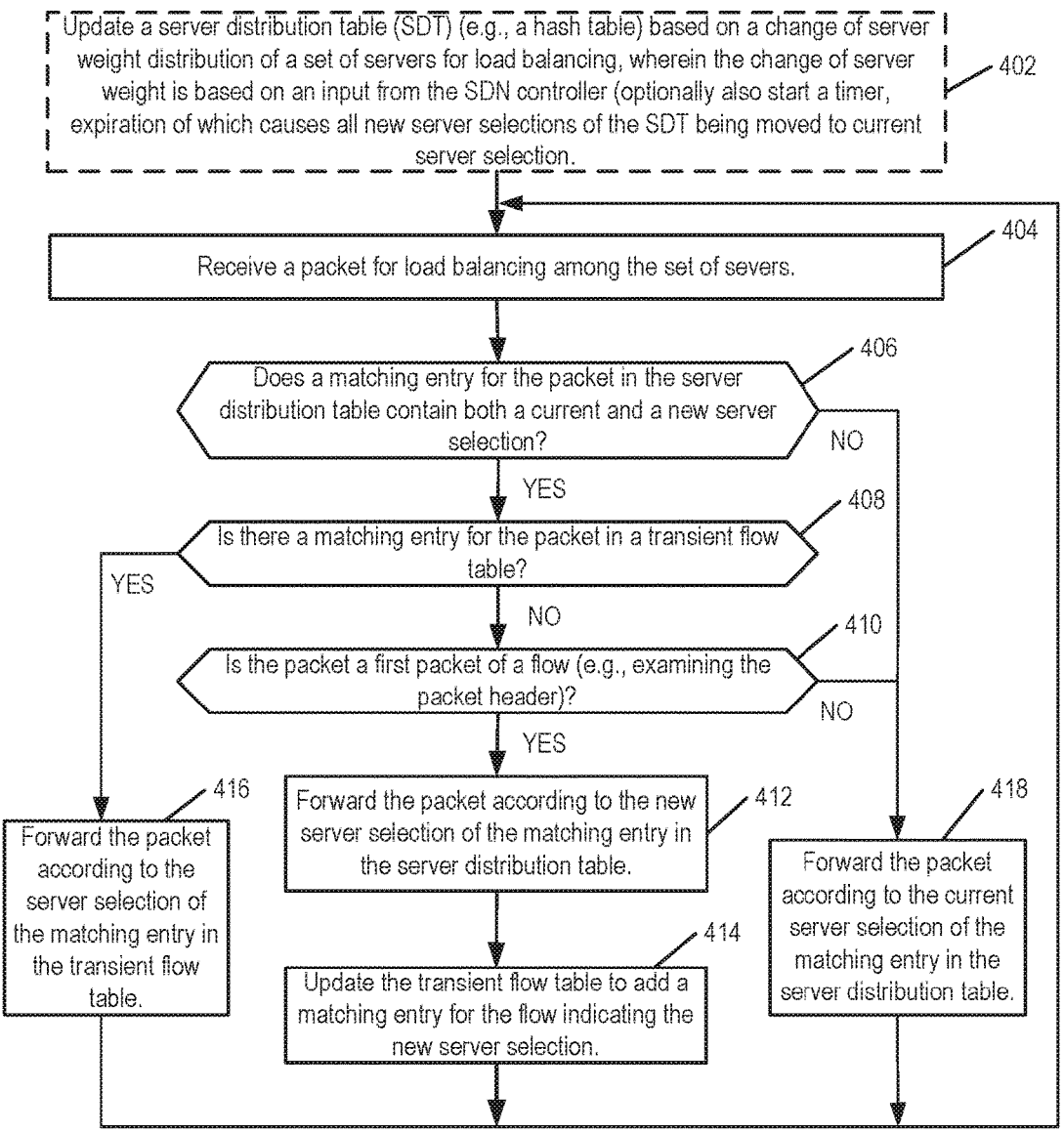
FIG. 4 is a flow diagram illustrating operations of load balancing according to one embodiment of the invention.

FIG. 4 is a flow diagram illustrating operations of load balancing according to one embodiment of the invention. Method 400 may be implemented in a network device, which implements a network element such as network element 105 of FIGS. 1-3, where the network device is coupled to a network containing a network controller, a set of network devices implementing network elements, and a cluster of servers containing a plurality of servers for load balancing of traffic flows to the network element serving as a load distributor such as network element 105.

Method 400 optionally starts at reference 402, where a server distribution table is updated based on a change of server weight distribution of the plurality of servers for load balancing. The change of server weight distribution may be based on an input from the SDN controller. The SDN controller provides the input based on an open stack or other applications about the server distribution. The server distribution may be due to status changes of the servers or other events. The server distribution table change is to provide one or more new server selections to some or all the entries in the server distribution table, so that the load balancing will utilize the one or more new server selections. The server distribution table change may be accompanied by a timer (e.g., 5 minutes), expiration of which causes all new server selections being moved to the current server selections. The timer may be used to ensure that the transient state will not be perpetuated thus avoid any deadlock and/or prolonging of the process.

At reference 404, a packet is received for load balancing among a plurality of severs. The network element may determine the packet is for load balancing, given its packet header (e.g., containing a destination address of the VIPA shared by the plurality of servers), or it may determine the packet needs to be load balanced due to characteristics of the packet or its associated flow and assign the VIPA to the packet.

At reference 406, it is determined whether a matching entry for the packet in a server distribution table contains both a current and a new server selection. If there is no matching entry, the process ends, and the network element may drop the packet or requests help from the network controller. If there is a matching entry and the matching entry contains both the current and new server selection, the flow goes to reference 408, where it is determined whether there is a matching entry for the packet in a transient flow table. The transient flow table maintains server selections when server distribution is in a transient state, where at least some of the plurality of servers are reconfigured so that at least one of the traffic flows is to be load balanced from one server to another server. In one embodiment, determining the matching entry in the transient flow table is based on a group identifier, a source IP address, and a destination IP address of the packet.

If there is a matching entry and the matching entry contains only the current server selection, the flow goes to reference 418, and the packet is forwarded according to the current server selection. Note there should not be a case where any matching entry contains only the new server selection, and the network element would be operated in an abnormal state in that case and need a corrective action.

At reference 408, if there is no matching entry for the packet in the transient flow table, the flow goes to reference

410. Otherwise the flow goes to reference 416, where the packet is forwarded to the server selection of the matching entry in the transient flow table.

At reference 410, it is determined whether the packet is the first packet of a flow. The determination may be based on the packet header, which contains an indication whether the packet is the first packet of the flow. The determination includes examining the indication in the packet. If it is not the first packet, the flow goes to reference 418 again.

If the packet is the first packet of the flow, the flow goes to reference 412, the packet is forwarded according to the new server selection of the matching entry in the server distribution table. Then the transient flow table is updated to add a matching entry for the flow indicating the new server selection at reference 414.

After references 416, 414, and 418, the flow goes back to reference 404, and waits for the next packet to arrive.

Figure 5:
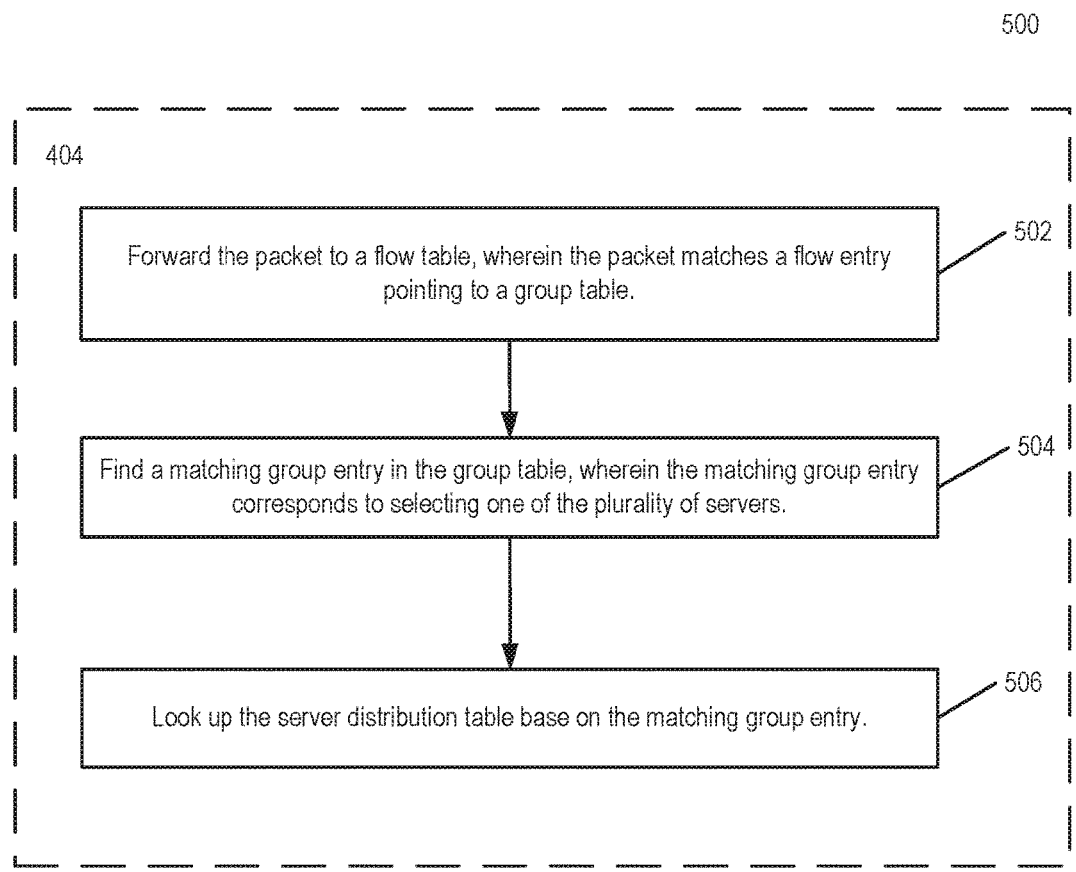
FIG. 5 is a flow diagram illustrating the receipt of a packet for load balancing according to one embodiment of the invention.

FIG. 5 is a flow diagram illustrating the receipt of a packet for load balancing according to one embodiment of the invention. Method 500 may be an implementation of reference 404 in one embodiment.

At reference 502, a received packet is forwarded to a flow table, where the packet matches a flow entry point to a group table. At reference 504, a matching group entry is found in the group table, where the matching group entry corresponds to selecting one of the plurality of servers. Then at reference 506, the server distribution table is looked up based on the matching group entry. In one embodiment, the server distribution table is a hash table, and the selection of the one of the plurality of servers is based on a hash algorithm.

Through methods 400 and/or 500, the load balancing operations may be performed with minimum traffic hit to the ongoing traffic flows in the associated SDN system during server reconfiguration. The approach with minimum traffic hit is sometimes referred to as a hitless load balancing transition. This approach does not require the network elements maintain a per flow based state, and it does not require the intervention of a network controller on a per flow basis during the transient state. In addition, the approach does not require any change in the existing forwarding tables, which perform the same operations as they do during a steady state, and which may comply with existing SDN standards such as the OpenFlow standard. The creation and changes in the transient flow table are not necessarily visible to the network controller or other network elements, thus the approach is desirable for a SDN system.

While embodiments of the invention do not require the intervention of the network controller, the network controller may be notified that the network element functioning about the load distributor having the capability to perform methods 400 and/or 500, the notification is particularly necessary when the network controller and the network devices implementing the network elements are made by different vendors. One or more ways may be utilized to identify the network element implemented by a network device with the capability:

The network element may negotiate with the network controller and indicate its capability of minimizing traffic disruption upon server reconfiguration.

A vendor extension may be added in communications between the network element and the network controller so that the network controller may recognize the vendor extension and know the network element's capability.

A predetermined data path identifier is assigned for the network element with the capability.

The network element may initiate communication through a predetermined port to the network controller.

SDN and NFV Environment Utilizing Embodiments of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620, which contains load balancer module 111 containing instructions for the operations of load balancing during a server reconfiguration as discussed herein above. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the load balancer module 111 may be executed by the networking hardware 610 to instantiate a set of one or more load balancer instances 621A-R. Each of the load balancer instances 621A-R, and that part of the networking hardware 610 that executes that load balancer instance (be it hardware dedicated to that load balancer instance and/or time slices of hardware temporally shared by that load balancer instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650, which contains load balancer 111. During operation, the processor(s) 642 execute the software 650 to instantiate one or more sets of one or more applications 664A-R, including instances of load balancer 111. While one embodiment does not implement virtualization, alternative embodiments may use different forms of virtualization—represented by a virtualization layer 654 and software containers 662A-R. For example, one such alternative embodiment implements operating system-level virtualization, in which case the virtualization layer 654 represents the kernel of an operating system (or a shim executing on a base operating system) that allows for the creation of multiple software containers 662A-R that may each be used to execute one of the sets of applications 664A-R. In this embodiment, the multiple software containers 662A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 654 represents a hypervisor (sometimes referred to as a virtual machine monitor (VMM)) or a hypervisor executing on top of a host operating system; and 2) the software containers 662A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 664A-R, as well as the virtualization layer 654 and software containers 662A-R if implemented, are collectively referred to as software instance(s) 652. Each set of applications 664A-R, corresponding software container 662A-R if implemented, and that part of the hardware 640 that executes them (be it hardware dedicated to that execution and/or time slices of hardware temporally shared by software containers 662A-R), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 662A-R differently. For example, while embodiments of the invention are illustrated with each software container 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 662A-R to VNEs also apply to embodiments where such a finer level of granularity is used.

In certain embodiments, the virtualization layer 654 includes a virtual switch that provides similar forwarding services as a physical Ethernet switch. Specifically, this virtual switch forwards traffic between software containers 662A-R and the NIC(s) 644, as well as optionally between the software containers 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 6C:
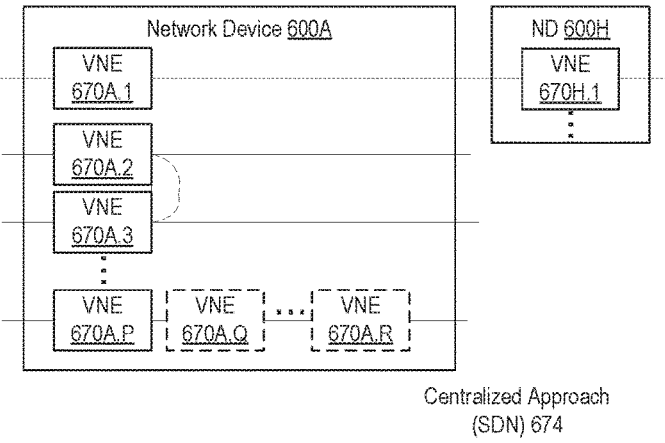
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software containers 662A-R may operate as servers; the same would be true for the hybrid network device 606; in the case of the special-purpose network device 602, one or more such servers could also be run on a virtualization layer executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
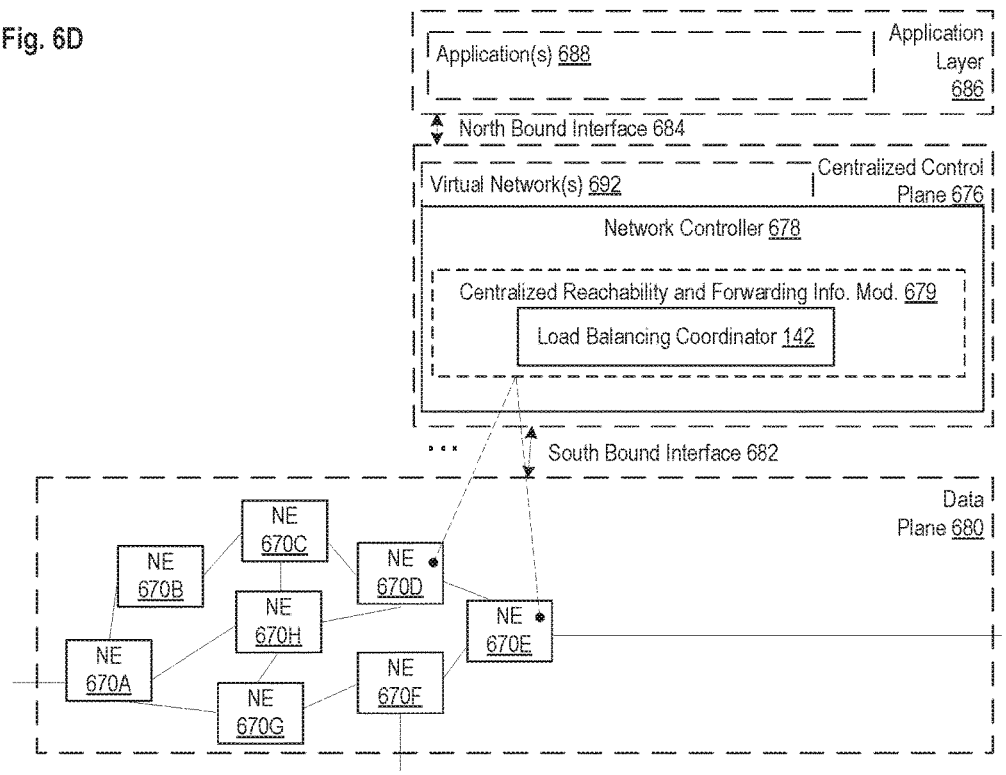
FIG. 6D illustrates a network with a single network element (NE) on each of the NDs, and with a centralized approach for maintaining reachability and forwarding information (also called network control), according to some embodiments of the invention.

FIG. 6D illustrates a network with a single network element on each of the NDs of FIG. 6A according to some embodiments of the invention. FIG. 6D illustrates network elements (NEs) 670A-H with the same connectivity as the NDs 600A-H of FIG. 6A.

FIG. 6D illustrates a network with a single network element on each of the NDs of FIG. 6A, and with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs. The centralized reachability and forwarding information module 679 contains load balancing coordinator 142 as discussed herein above in relation to FIG. 1.

Where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
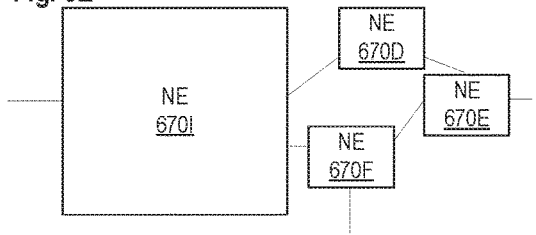
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
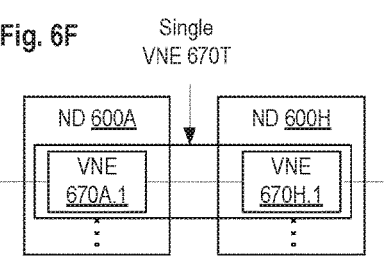
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 976 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The operations of the flow diagrams FIGS. 4 and 5 are described with reference to the exemplary embodiment of FIGS. 1-3, and 6. However, it should be understood that the operations of flow diagrams can be performed by embodiments of the invention other than those discussed with reference to the exemplary embodiment of FIGS. 1-3, and 6, and the exemplary embodiment of FIGS. 1-3, and 6 can perform operations different than those discussed with reference to the flow diagrams of FIGS. 4 and 5.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network device coupled to a software-defined networking (SDN) system, the method comprising:
   determining that a received packet requires load balancing;
   responsively determining whether a matching entry for the packet in a server distribution table contains both a current and a new server selection;
   upon determining that the matching entry in the server distribution table contains both the current and new server selection, determining whether there is a matching entry for the packet in a transient flow table, wherein the transient flow table maintains server selections when at least one of a plurality of servers is reconfigured so that at least one traffic flow is to be load balanced from one server to another server; and
   upon determining that there is a matching entry for the packet in the transient flow table, forwarding the packet according to the matching entry in the transient flow table.

2. The method of claim 1, further comprising:
   upon determining that the matching entry in the server distribution table contains only the current server selection, forwarding the packet according to the current server selection.

3. The method of claim 1, further comprising:
   upon determining that there is no matching entry for the packet in the transient flow table, determining whether the packet is a first packet of a traffic flow; and
   upon determining that the packet is not the first packet, forwarding the packet according to the current server selection.

4. The method of claim 3, further comprising:
   upon determining that the packet is the first packet, forwarding the packet according to the new server selection; and
   updating the transient flow table to add a matching entry for the traffic flow indicating the new server selection.

5. The method of claim 1, further comprising:
   updating the server distribution table based on a change of server weight distribution of the plurality of servers, wherein the change of server weight distribution is based on an input from a SDN controller.

6. The method of claim 5, further comprising:
   starting a timer, expiration of which causes all new server selections of the server distribution table being moved to current server selections.

7. The method of claim 1, wherein receiving the packet for load balancing among the plurality of servers comprising:
   forwarding the packet to a flow table, wherein the packet matches a flow entry pointing to a group table;
   finding a matching group entry in the group table, wherein the matching group entry corresponds to selecting one of the plurality of servers; and
   looking up the server distribution table based on the matching group entry.

8. The method of claim 1, wherein the server distribution table is a hash table.

9. The method of claim 1, wherein determining the matching entry in the transient flow table is based on a group identifier, a source Internet Protocol (IP) address, and a destination IP address of the packet.

10. An apparatus coupled to a software-defined networking (SDN) system, the apparatus comprising:
    a processor and a non-transitory machine-readable storage medium coupled to the processor, the non-transitory machine-readable storage medium containing operations executable by the processor, wherein the apparatus is operative to: determine that a received packet requires load balancing,
    responsively determine whether a matching entry for the packet in a server distribution table contains both a current and a new server selection,
    upon a determination that the matching entry in the server distribution table contains both the current and new server selection, determine whether there is a matching entry for the packet in a transient flow table, wherein the transient flow table maintains server selections when at least one of a plurality of servers is reconfigured so that one traffic flow is to be load balanced from one server to another server, and
    upon a determination that there is a matching entry for the packet in the transient flow table, forward the packet according to the matching entry in the transient flow table.

11. The apparatus of claim 10, wherein the apparatus is further operative to:
    upon a determination that the matching entry in the server distribution table contains only the current server selection, forward the packet according to the current server selection.

12. The apparatus of claim 10, wherein the apparatus is further operative to:

upon a determination that there is no matching entry for the packet in the transient flow table, determine whether the packet is a first packet of a traffic flow, upon a determination that the packet is not the first packet, forward the packet according to the current server selection.

13. The apparatus of claim 12, wherein the apparatus is further operative to:

upon a determination that the packet is the first packet, forward the packet according to the new server selection, and update the transient flow table to add a matching entry for the traffic flow indicating the new server selection.

14. The apparatus of claim 10, wherein the server distribution table is a hash table.

15. A non-transitory machine-readable medium having instructions stored therein, which when executed by a processor, cause the processor to perform operations in a network device coupled to a software-defined networking (SDN) system, the operations comprising:

determining that a received packet requires load balancing;

responsively determining whether a matching entry for the packet in a server distribution table contains both a current and a new server selection;

upon determining that the matching entry in the server distribution table contains both the current and new server selection, determining whether there is a matching entry for the packet in a transient flow table, wherein the transient flow table maintains server selections when at least one of a plurality of servers is reconfigured so that at least one traffic flow is to be load balanced from one server to another server; and upon determining that there is a matching entry for the packet in the transient flow table, forwarding the packet according to the matching entry in the transient flow table.

16. The non-transitory machine-readable medium of claim 15, the operations further comprising:

upon determining that the matching entry in the server distribution table contains only the current server selection, forwarding the packet according to the current server selection.

17. The non-transitory machine-readable medium of claim 15, the operations further comprising:

upon determining that there is no matching entry for the packet in the transient flow table, determining whether the packet is a first packet of a traffic flow; and upon determining that the packet is not the first packet, forwarding the packet according to the current server selection.

18. The non-transitory machine-readable medium of claim 17, the operations further comprising:

upon determining that the packet is the first packet, forwarding the packet according to the new server selection; and updating the transient flow table to add a matching entry for the traffic flow indicating the new server selection.

19. The non-transitory machine-readable medium of claim 17, wherein determining that the packet is the first packet comprises examining a header of the packet.

20. The non-transitory machine-readable medium of claim 15, wherein receiving the packet for load balancing among the plurality of servers comprising:

forwarding the packet to a flow table, wherein the packet matches a flow entry pointing to a group table;

finding a matching group entry in the group table, wherein the matching group entry corresponds to selecting one of the plurality of servers; and looking up the server distribution table based on the matching group entry.

\* \* \* \* \*